UNITED STATES PATENT OFFICE.

EMIL KIPPER AND JARVIS B. EDSON, OF ADAMS, MASSACHUSETTS.

MANUFACTURE OF BRUSH-BODIES, &c., FROM PYROXYLINE COMPOUNDS.

SPECIFICATION forming part of Letters Patent No. 299,804, dated June 3, 1884.

Application filed January 24, 1884. (No specimens.)

*To all whom it may concern:*

Be it known that we, EMIL KIPPER, a resident of Adams, Berkshire county, Massachusetts, and a subject of the King of Prussia, and JARVIS B. EDSON, a citizen of the United States, residing at Adams, Berkshire county, Massachusetts, have invented new and useful Improvements in Manufacture of Brush-Bodies and other Articles from Pyroxyline Compounds, of which the following is a specification.

This invention has for its object to provide an improved method of manufacturing the bodies of brushes, mirrors, and other articles from pyroxyline compounds, whereby a superior and desirable article is secured without increasing the cost of production.

Heretofore in the manufacture of the bodies or backs of brushes and mirrors, in order to economize the consumption of the plastic pyroxyline compounds, it has been customary to introduce within the same a body or core of wood having the outline of the finished article; but such wooden core possesses serious objections, in that it tends to and will swell or shrink by the influence of different degrees of moisture, which results in the plastic covering becoming split or separated from the core.

This objection is avoided by our invention, to which end it consists in first molding a body or core from plastic zylonite or other pyroxyline compound into substantially the form and dimension of the finished article, and then attaching thereto an exterior thin sheet or film of zylonite or other pyroxyline compound of the superior grade it is desired that the finished article shall possess, whereby the whole combines and constitutes in effect one homogeneous mass.

The invention further consists in certain other features, which will be hereinafter described and claimed.

In carrying out our invention we first make a main body or core of such plastic compound of nearly the complete and finished dimensions and form, not, however, necessarily of the same quality of stock, but of a grade of material as manufactured from scraps and dirty or inferior material, or such as has a greater degree of adulteration, or is not as clean and white as desired, may be used. After having constructed such body or base, it then only remains to replace the same in the die or mold, having previously placed in such die or mold a very thin sheet of, say, one-sixteenth of an inch in thickness, or less, of such a grade of material as it is desired to have the exterior of the finished article possess, so that when another molding takes place the two portions or grades of pyroxyline compounds, by virtue of their possessing similar characteristics, will become molded and combined with each other and thoroughly of one homogeneous mass, quite equal to what they would have been if originally made of one mass or blank and of the same grade of material throughout. By this means it will be readily seen that much inferior, dirty, and other stock, even highly adulterated, and possessing less strength and tenacity, may be utilized to a very great extent in forming articles where economy of material is of great importance, and still possess on its exterior surface a fine and finished material, free from flaws and imperfections, and quite equivalent to what it would have been if made entirely of perfect stock.

Another advantage in this process of construction is that when the finished article is to represent ivory having streaks like the grain of ivory unbleached it only becomes necessary that this extra outside sheet or film or coating should be made of such grain ivory. This will be recognized as of considerable importance when it is remembered that much manipulation is required in order to have zylonite or similar pyroxyline compounds with a grain to represent the annular growths or characteristics of unbleached ivory, and which consequently increase the cost of that class of pyroxyline compounds very much above that in which the material is all of the same shade or color throughout.

In forming this combination of an outer and thin coating of plastic composition with a base of similar pyroxyline compound, either the heat and pressure in the second operation may be resorted to, or a cement or solvent of the material may be resorted to, in order to more perfectly effect the union or combination of the two materials referred to. The use of such solvent becomes more necessary in cases where the body or block used in such structure is of an inferior grade or is of a greater degree of adulteration than that of which the exterior shell or veneering is composed, and consequently we do not limit ourselves to the use of a solvent or to proceeding without the use of a solvent, as either method may be adopted for the purposes described.

In cases where a base or body of plain or scrap material of any desired color or shade is to be covered or coated with any other shade or quality of material of which pyroxyline forms the base, regardless of whether white or any other shade, the operation becomes the same, and may be practiced with equal results—as, for instance, in the case of tortoise-shell or amber.

Having thus described our invention, what we claim is—

1. The process herein described of making the bodies or backs of brushes and other articles, which consists in first producing a body or core from plastic zylonite or other pyroxyline compound of substantially the form and dimension of the finished article, and then attaching thereto a sheet or film of zylonite or other pyroxyline compound of the grade which it is desired to have the exterior of the article possess, as set forth.

2. The process herein described of making the bodies or backs of brushes and other articles, which consists in first molding a body or core from plastic zylonite or other pyroxyline compound in a die or mold into substantially the complete and finished dimension and form, subsequently placing the body or core on a thin sheet or film of zylonite or other pyroxyline compound of the grade it is desired that the exterior of the article possess, and subjecting the whole to the action of a die or mold to unite the sheet or film and the core, as set forth.

3. The process herein described of making the backs of brushes and other articles, which consists in first molding a body or core of scraps or an inferior grade of plastic zylonite or other pyroxyline compound, then placing the body or core on a thin sheet of zylonite or other pyroxyline compound of the superior grade it is desired that the exterior of the article possess, and finally subjecting the whole to the action of a die or mold to unite the body or core and the exterior sheet or film, as set forth.

4. A body and back for brushes and similar articles, composed of a body or core of an inferior grade of zylonite or other pyroxyline compound having an attached exterior covering composed of a sheet or film of the superior grade of the said compound which it is desired that the article possess, substantially as described.

In testimony whereof we have hereunto set our hands in the presence of two subscribing witnesses.

EMIL KIPPER.
JARVIS B. EDSON.

Witnesses:
FRANK A. FOWLER,
RUSL. B. DEAN.